United States Patent [19]

Grignon et al.

[11] Patent Number: 5,201,182
[45] Date of Patent: Apr. 13, 1993

[54] METHOD FOR THE THERMAL CONDITIONING OF ELECTRONIC EQUIPMENT MOUNTED IN AIRCRAFT, AND SYSTEMS FOR THE IMPLEMENTATION THEREOF

[75] Inventors: Robert Grignon, Verrieres Le Buisson; Pascal Trouillot, Courbevoie, both of France

[73] Assignee: Thomson-CSF, Puteaux, France

[21] Appl. No.: 689,375

[22] Filed: Apr. 22, 1991

[30] Foreign Application Priority Data

May 11, 1990 [FR] France ................... 90 05901

[51] Int. Cl.$^5$ .................... F25B 21/02; B60H 1/32
[52] U.S. Cl. ............................ 62/3.2; 62/241
[58] Field of Search ............ 62/3.2, 3.61, 241, 136, 62/401

[56] References Cited

U.S. PATENT DOCUMENTS

| Re. 24,179 | 7/1956 | Breaux et al. | 62/241 |
|---|---|---|---|
| 2,473,496 | 6/1949 | Mayer | 62/241 |
| 2,477,931 | 8/1949 | King | 62/138 |
| 2,503,250 | 4/1950 | Eckert | 62/241 |
| 2,721,456 | 10/1955 | Whitney et al. | 62/136 |
| 2,786,341 | 3/1957 | Green | 62/241 |
| 2,839,900 | 6/1958 | Green | 62/241 |
| 3,236,056 | 2/1966 | Phillips et al. | 62/3.61 |
| 4,209,993 | 7/1980 | Rannenberg | 62/241 |

FOREIGN PATENT DOCUMENTS 342166 11/1984 European Pat. Off. .
3824468 1/1990 Fed. Rep. of Germany .
0285010 3/1990 Japan .

OTHER PUBLICATIONS

Engineering (Incl. Machine Shop Mag.), vol. 222 No. 5, R. Axe, "Taking the Heat . . . ".

Primary Examiner—Albert J. Makay
Assistant Examiner—William C. Doerrler
Attorney, Agent, or Firm—Roland Plottel

[57] ABSTRACT

In a method for the thermal conditioning of electronic equipment mounted on aircraft, a flow of ram air is tapped and transferred to first means enabling said flow of air to be given a first negative gradient of temperature after which, if necessary, the flow air coming from said first cooling means is transferred to second means capable of giving a second negative gradient of temperature to said flow of air, after which the flow of air coming directly from the first cooling means, combined as the case may be with the flow of air coming from the second cooling means, is transferred to the immediate vicinity of the electronic equipment to be cooled, thus achieving an appropriate thermal conditioning of said electronic equipment. The disclosure also relates to the systems designed for the implementation of this method.

10 Claims, 3 Drawing Sheets

METHOD FOR THE THERMAL CONDITIONING OF ELECTRONIC EQUIPMENT MOUNTED IN AIRCRAFT, AND SYSTEMS FOR THE IMPLEMENTATION THEREOF

BACKGROUND OF THE INVENTION

1. Field of the Invention

An object of the present invention is a method for the thermal conditioning of equipment mounted in aircraft. It further relates to systems for the implementation of this method.

Pods containing electronic equipment are fixed beneath an under-structure of certain aircraft, notably military aircraft. The term "electronic equipment" herein indicates any device, system, apparatus etc. containing at least one electronic component.

2. Description of the Prior Art

Until now, a certain number of known devices have been used to cool the excessively hot ram air at the interface between an aircraft and its environment. One of these devices is constituted by a thermal machine consisting of a compressor in series with an exchanger and a pressure-reducing turbine. This arrangement is commonly known as a "bootstrap assembly". In such an arrangement, the pressure-reducing turbine is supplied with air. The pressure of this air is raised by the action of a compressor and, through the action of a heat exchanger, the temperature of this air is substantially equal to that of the air tapped at the air inlet. The pressure reduction that takes place through the turbine is accompanied by a substantial cooling of the air. If the cooing system of the exchanger uses tapped ram air, it is clear that the bootstrap system is a cooling circuit working on ram air only. This system has the drawback of being bulky and of having a relatively substantial mass: this is obviously not advantageous for aircraft. Furthermore, it is rather complicated to make. This complexity, in combination with the fact that it is particularly difficult to make the final precision settings required by the system, means that the cost price of the unit is relatively high.

It is an object of the present invention to propose a method that can be used to overcome the above-mentioned drawbacks, through a possibility of implementation using new systems that have a relatively reduced ratio of space factor to mass.

It is another object of the invention to make systems that enable efficient thermal conditioning of electronic equipment while, at the same time, being less complex, thus entailing an appreciably lower cost price.

SUMMARY OF THE INVENTION

An object of the present invention, therefore, is a method for the thermal conditioning of electronic equipment mounted on aircraft, wherein a current or flow of ram air is tapped and transferred to first means enabling said flow of air to be given a first negative gradient of temperature after which, when said first negative gradient of temperature is not sufficient to attain a temperature necessary for an appropriate cooling of said electronic equipment, the current of air coming from said first cooling means is transferred to second means capable of giving a second negative gradient of temperature to said flow of air, after which the flow of air coming directly from the first cooling means, combined as the case may be with the flow of air coming from the second cooling means, is transferred to the immediate vicinity of the electronic equipment to be cooled, thus achieving an appropriate thermal conditioning of said electronic equipment.

In a first thermal conditioning system implementing the method, according to the invention, for the thermal conditioning of the electronic equipment mounted on the aircraft, this system includes:

a ram air inlet made on the pod containing the electronic equipment and divided into two branches;

first means for the cooling of the flow of ram air constituted by a pressure-reducing turbine, supplied by a branch of the ram air inlet;

second cooling means constituted by a system of thermoelectric elements, arranged so that all the cold junctions form an element that is added on or fixedly joined to the outlet conduit of the turbine transferring the already cooled air towards the electronic equipment to be cooled, the hot junctions of the system of thermoelectric elements being arranged within the second branch coming from the ram air inlet.

In this first embodiment, the turbine is advantageously coupled to a DC current generator supplying the system of thermoelectric elements. Although this approach is the most advantageous one since the energy is given by the pressure-reducing turbine, it is clear that other independent direct current supply systems or sources could be used to entirely or partly supply the system of thermoelectric elements.

In a second embodiment according to the invention, the system for the thermal conditioning of the electronic equipment includes:

a ram air inlet made on the pod containing the electronic equipment and divided into two branches;

first means for the cooling of the flow of ram air, constituted by an axial or centripetal type of turbine supplied by a first branch of the ram air inlet;

second cooling means constituted by a centrifugal type of compressor, coupled to the shaft of the turbine and supplied by the second branch of the ram air inlet;

means enabling the cooled air coming from the turbine to be transferred to the immediate vicinity of the electronic equipment;

means enabling the air coming from the compressor to be transferred either to the exterior if this air is at a temperature higher than the maximum air temperature stipulated for the cooling of the electronic equipment, or to the immediate vicinity of said electronic equipment to be cooled if the temperature of this air is equal to or lower than the maximum temperature stipulated for the cooling of said equipment.

The selective means for the transfer of the air coming out of the compressor may be constituted by a three-way heat-sensitive valve, duly programmed to open or close as a function of a set-value temperature equal to the maximum temperature stipulated for the cooling.

In one variant of this second embodiment according to the invention, the thermal conditioning system and the ram air inlet provide the supply of air only to the turbine while the compressor is supplied by an air inlet within the pod.

BRIEF DESCRIPTION OF THE DRAWINGS

Other features and advantages of the invention shall appear from the following non-restrictive description of shapes and embodiments according to the invention, made with reference to the appended drawings, wherein.

DETAILED DESCRIPTION OF THE INVENTION

Figure 1:
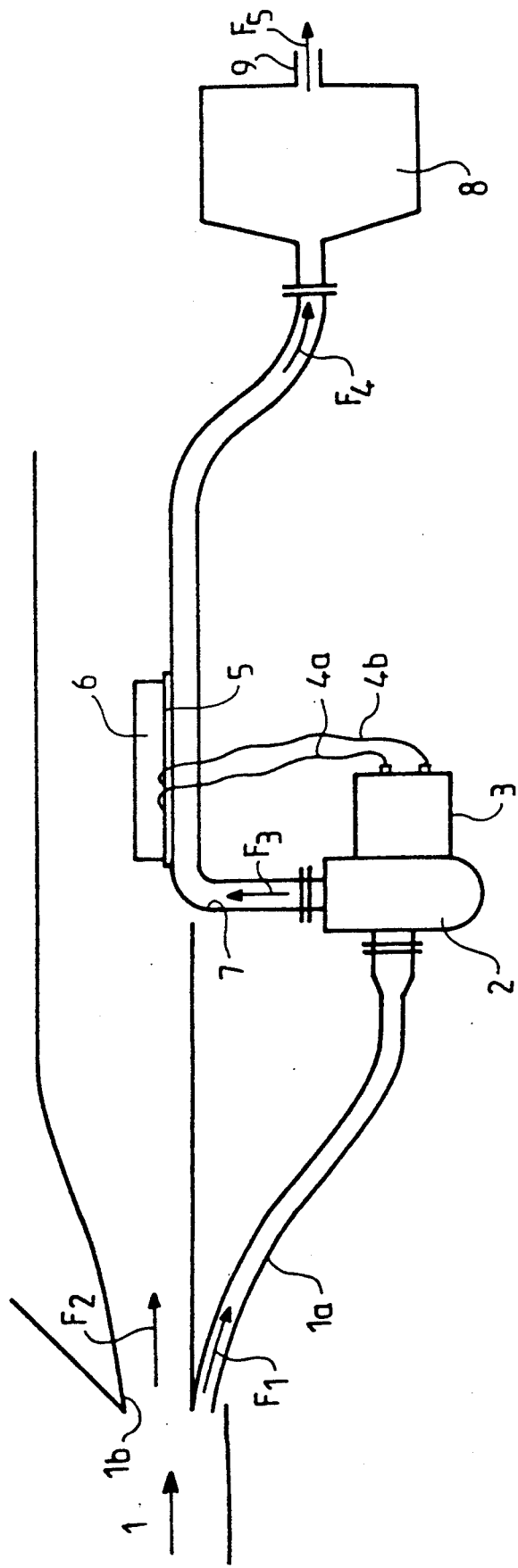
FIG. 1 shows a schematic view of a first embodiment enabling the implementation of the invention.

FIG. 1 shows a system of thermal conditioning by the cooling of the ram air which is tapped by an air inlet 1 and then immediately divided into a branch 1a along the arrow F1 and a branch 1b along the arrow F2. The current of air transferred by the branching conduit 1a is sent to a pressure-reducing turbine 2 coupled to a DC generator 3 that supplies a system of thermoelectric elements 5, 6 by means of conducting cables 4a, 4b. The cold junctions of this system thermoelectric elements 5, 6 are brought together in an element 5 attached to a conduit 7 that transfers the air in the direction F3, F4 to an item of electronic equipment 8 that is to be cooled. Once the cooling is F5 by the conduit 9. The ram air transferred by the branch 1b in the direction of the arrow F2 is meant to cool the hot junctions of the thermoelectric elements, incorporated in a convector heater 6.

The system works as follows:

If the temperature of the air at the outlet of the turbine 2 is low enough, this air may be used directly to cool the equipment 8, for example by forced convection. In this case, the electrical energy given by the DC generator 3, from the mechanical energy recovered at the shaft of the turbine 2, may be used for any application compatible with this type of electric supply, the calories released by the system being discharged into the flow of external air.

If not, i.e. if the negative gradient of temperature $\Delta T$ is not sufficient to reach a temperature $T_o$ needed for an accurate cooling of the electronic equipment, the system 5, 6 working by Peltier effect should then be put under DC voltage given by the DC generator, a magneto 3 for example, via the electric cables 4a, 4b. This operation of turning on the voltage may be activated by a switch not shown in the drawing. The switch is activated after amplification, by a signal generated by a heat probe positioned on the conduit 7. For, as is well known, in Peltier effect systems a difference in temperature arises between the opposite soldered faces of the element. When the system 5, 6 is energized, the element 5 containing the cold junctions convectionally gives the current in the conduit 7 an additional gradient $\Delta T_2$ that gets added to the negative gradient $\Delta T_1$ at the outlet of the turbine, and makes the flow of air along F4 undergo a decrease in temperature sufficient to achieve the appropriate thermal conditioning of the equipment 8 which, as the case may be, is provided with an appropriate connection device. It is clear that the element 5 may be arranged so that the number of elements to be energized is a function of the cooling temperature $T_r$ to be attained. It is then possible to envisage a system of control by heat probe so that the number of thermoelectric elements to be energized can appropriately adusted. It is clear that control and regulation systems of this type can be obtained by circuits of electronic components that are commercially available.

Figure 2:
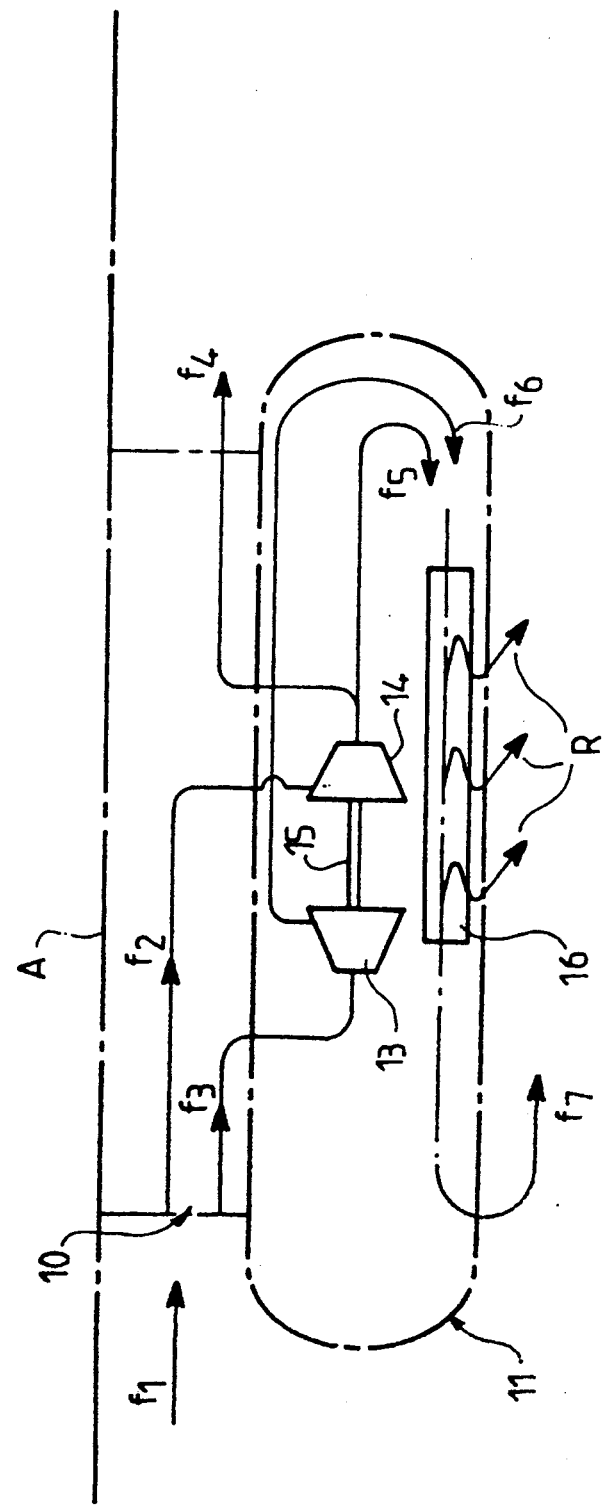
FIG. 2 shows a schematic view of a second embodiment enabling the implementation of the invention.

In the embodiment of FIG. 2, a pod 11 is fixed beneath an aircraft by means of a beam 10 from which an inlet of ram air is got in the direction f1. This ram air is then divided into f2 and f3. The flow of air f3 is designed to supply an axial or centripetal type of turbine 13, the outlet shaft 15 of which drives a compressor 14 supplied with ram air along the arrow f2. In the pod 11, there is also a piece of electronic equipment 16 emitting heat radiation R designed to be cooled by the air coming from the turbine 13 along the arrow f6 or, possibly, by the air coming out of the compressor 14.

In fact, this cooling system works as follows:

The turbine 13, supplied with ram air tapped from outside the aircraft along f1, f3, cools this air by adiabatic expansion, and the air coming out of the turbine along f6 is used to cool the calorific energy dissipating electronic equipment 16, after which it is removed to the exterior of the pod along f7. The centrifugal type compressor 14, coupled to the driving shaft 15 of the turbine 13, is designed to recover the mechanical energy developed at said shaft 15 of said turbine 13 by the expansion of the gaseous air. In the embodiment of FIG. 2, the air along f2 may be, firstly, discharged outwards along f4. Otherwise, if the temperature is equal to or lower than than a set value temperature equal to the maximum temperature capable of allowing said air to be used to cool the electronic equipment 16, provided if necessary with an appropriate connection device, then it is transferred by the activation of a solenoid valve (not shown in the drawing) along f5 towards said equipment 16 jointly with the air coming from the turbine 13 along f6, this air being also pushed outwards along f7 after being used to convey heat. It is therefore clear that, should the temperature of the air coming from the compressor be low enough for it to be used in the cooling of the equipment 16, the flow rate of cooling air coming from the system will be the sum of the flow rate of the air going through the turbine and the flow rate of the air going through the compressor. The result thereof is that the thermal conditioning of the equipment 16 will be improved to a certain extent.

The alternative embodiment of FIG. 3 again has the same constituent elements as in the embodiment of FIG. 2, except that the supply of the compressor 14 is done along f9 from a flow of air tapped directly in the pod. According to a non-restrictive example, this flow of air is tapped from the flow of air coming from the convection system incorporated into the electronic equipment 16 to be cooled. Such an arrangement has three advantages:

Firstly, the action of the compressor 14, which takes its supply in the pod 11, places this pod under depression, thus furthering an increase in the rate of pressure-reduction available for the turbine and, consequently, the cooling of the gas by expansion in this turbine is increased.

Secondly, a forced flow is created in the pod between the outlet of the turbine along f8 and the inlet of the compressor 14 along f9, thus enabling an increase in the velocities of the air coming to the equipment 16 to be cooled and hence, an improvement in the heat exchanges between this equipment 16 and the cooling air that reaches it along f8.

Thirdly, the flow rate of air tapped from the exterior of the aircraft is reduced and, since the air passing into the compressor 14 is tapped in the pod 11, the result thereof is a reduction in the drag caused by the tapping done by the ram air inlet, this drag being part of the total balance of drag of the aircraft.

In any case, it would be appropriate to regulate the loss of pressure at the compressor circuit (f9, 14, f4) to effectively recover all the power delivered by the turbine 13.

Figure 3:
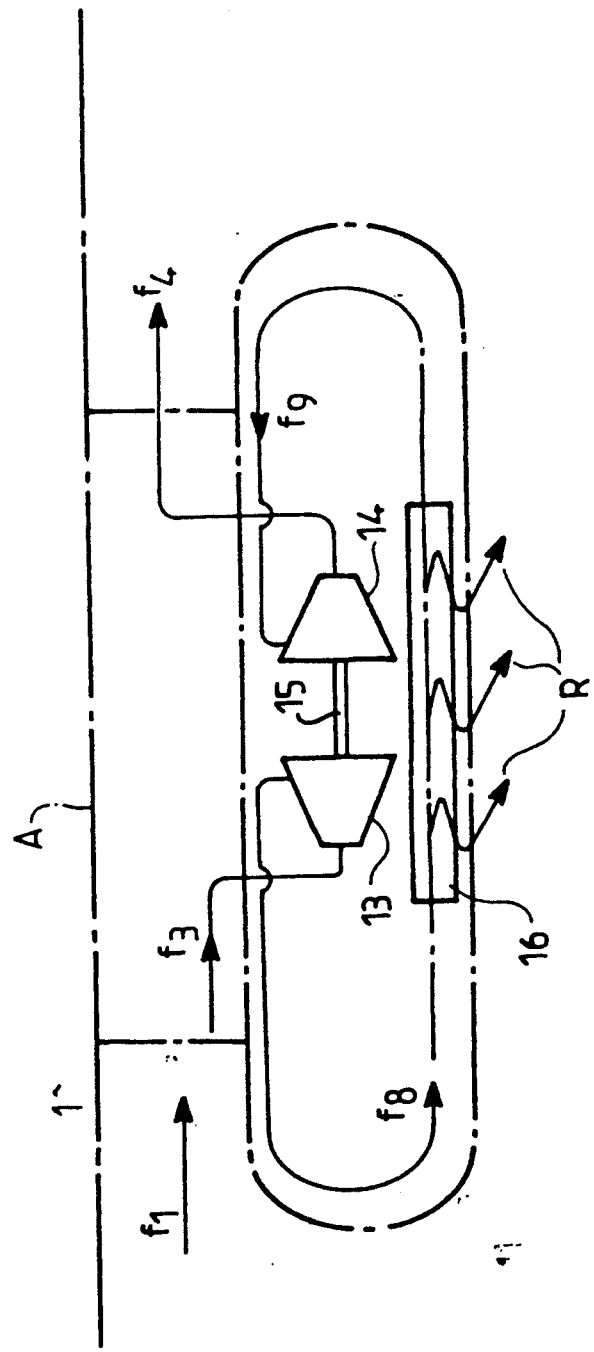
FIG. 3 shows a schematic view of a variant of the embodiment of FIG. 2.

The embodiments of FIGS. 2 and 3 are characterized, with respect to the basic system illustrated in FIG. 1, by comparable thermal performance characteristics, similar or even lower space factor and mass and reduced cost price.

It is clear that the above-described systems in n way restrict the scope of the invention which covers every modification and variant derived from the same basic principle, namely the thermal conditioning of electronic equipment, mounted on the aircraft, by means of the ram air tapped from the exterior and processed by the cooperation of two sorts of different means aimed at giving said ram air a negative gradient of temperature, enabling it to be used for said thermal conditioning. Besides, it is quite clear that the systems according to FIGS. 1, 2 and 3 incorporate different control sensors enabling the opening and closing of the valves controlling the inlet and outlet of the flows of air at the turbine, the compressor and the equipment to be cooled, respectively.

What is claimed is:

1. A system for thermal conditioning of electronic equipment mounted on aircraft, wherein a flow or ram air is tapped and transferred to first cooling means for enabling said flow of air to be given a first negative gradient of temperature after which, when said first negative gradient of temperature is not sufficient to attain a temperature necessary for an appropriate cooling of said electronic equipment, the current of air coming from said first cooling means is subjected to second means for giving a second negative gradient of temperature to said flow of air, is then transferred to the immediate vicinity of the electronic equipment to be cooled, thus achieving an appropriate thermal conditioning of said electronic equipment, and wherein a ram air inlet made on a pod containing the electronic equipment traps said flow of ram air and is divided into two branches; said first cooling means for cooling the flow of ram air being constituted by a pressure-reducing turbine, supplied by one of said branches of the ram air inlet; said second cooling means being constituted by a system of thermoelectric elements, arranged so that all the cold junctions form an element that is added on or fixedly joined to an outlet conduit of the turbine transferring the already cooled air towards the electronic equipment to be cooled, the hot junctions of the system of thermoelectric elements being arranged within the second of said branches coming from the ram air inlet.

2. A system according to claim 1, wherein the turbine is coupled to a DC current generator supplying the system of thermoelectric elements.

3. A system according to claim 1, wherein the system of thermoelectric elements is supplied by an independent direct current source.

4. A system for thermal conditioning of electronic equipment mounted on aircraft, wherein a flow of ram air is tapped and transferred to first cooling means for enabling said flow of air to be given a first negative gradient of temperature after which, when said first negative gradient of temperature is not sufficient to attain a temperature necessary for an appropriate cooling of said electronic equipment, the current of air coming from said first cooling means is subjected to second means for giving a second negative gradient of temperature to said flow of air, is then transferred to the immediate vicinity of the electronic equipment to be cooled, thus achieving an appropriate thermal conditioning of said electronic equipment, and wherein a ram air inlet made on a pod containing the electronic equipment traps said flow of ram air and contains first and second branches; said first cooling means for the cooling of the flow of ram air, being constituted by an axial or centripetal type of turbine supplied by said first branch of the ram air inlet; said second cooling means constituted by a centrifugal type of compressor, activated by a driving shaft of the turbine and supplied with ram air by the second branch of the ram air inlet; means for transferring the cooled air coming from the turbine to the immediate vicinity of the electronic equipment; and selective means enabling the air coming from the compressor to be transferred either to the exterior if this air is at a temperature higher than the maximum air temperature stipulated for the cooling of the electronic equipment, or to the immediate vicinity of said electronic equipment to be cooled if the temperature of this air is equal to or lower than the maximum temperature stipulated for the cooling of said equipment.

5. A system according to claim 4, wherein the selective means for the transfer of the air coming out of the compressor are constituted by a three-way heat-sensitive valve duly programmed to open or close as a function of a set-value temperature equal to the maximum temperature stipulated for the cooling.

6. A system according to claim 5 wherein the ram air inlet further comprises means for supplying only the turbine while the compressor is supplied by air from an air inlet within the pod.

7. A system according to claim 6, wherein the air inlet within the pod, for the compressor, is located on the system of cooling air coming from the electronic equipment.

8. A cooling system for an aircraft comprising
an air inlet (1) adapted to receive a flow of air;
a first branch (1a) and a second branch (1b) connected to receive said air flow from said inlet;
a pressure reducing turbine (2) having an input connected to said first branch to receive said air from said inlet, and an output connected to a conduit (7) to pass said air, cooled by said turbine, to an area (8) to be cooled; and
a thermoelectric element (5.6) having a cold face (5) connected to said conduit (7) to further cool the air passing through said conduit toward said area (8) and a hot face (6) connected to said second branch (1b) and to give up heat to the air flowing through said second branch.

9. A system according to claim 8, further comprising an electric generator (3) driven by said turbine (2) and an output cable (4a) from said generator to said thermoelectric element (5.6) for powering said element.

10. A system according to claim 8, wherein said thermoelectric element (5.6) comprises a plurality of units which may be separately energized.

* * * * *